United States Patent

Uchytil et al.

[15] 3,663,376

[45] May 16, 1972

[54] SELECTIVE SPOT PLATING OF LEAD FRAME SHEETS

[72] Inventors: Gary Uchytil, Campbell; Franz Kolterer, Los Altos, both of Calif.

[22] Filed: Mar. 17, 1971

[21] Appl. No.: 125,237

[52] U.S. Cl. ..................................204/15, 96/36.2, 117/212

[51] Int. Cl. ......................C23b 5/48, G03c 5/00, B44d 1/18

[58] Field of Search ......................204/15; 29/625; 117/212; 96/36.2

[56] References Cited

UNITED STATES PATENTS

| | | | |
|---|---|---|---|
| 2,051,663 | 8/1936 | Werth | 204/15 |
| 2,934,479 | 4/1960 | Deer | 204/15 |
| 3,325,379 | 6/1967 | Bussolini et al. | 204/12 |
| 3,349,480 | 10/1967 | Rashleigh | 204/15 |
| 3,449,221 | 6/1969 | Thomas | 117/212 |
| 3,537,175 | 11/1970 | St. Clair et al. | 29/625 |

FOREIGN PATENTS OR APPLICATIONS

| | | | |
|---|---|---|---|
| 661,273 | 11/1951 | Great Britain | 204/15 |
| 544,670 | 3/1952 | Canada | 204/15 |
| 829,191 | 1/1952 | Germany | 204/15 |

*Primary Examiner*—John H. Mack
*Assistant Examiner*—T. Tufariello
*Attorney*—Townsend & Townsend

[57] ABSTRACT

Relatively small apertures or passages in a sheet are masked to prevent their plating during the electroplating of selected zones of one side of the sheet by filling the apertures with a readily deformable, photo-hardenable material. A photosensitive facing is applied to each side of the sheet and the side including the plated zones is masked with a shield placed thereover to define the zones. Thereafter, both sheet sides are subjected to light, the shield is removed and the sheet is placed in a developing tank for removal of facing portions overlying the zones and the zones of the sheet are electroplated. Thereafter, the remaining facings and the photo-hardenable material are stripped to bare both sheet sides and the apertures for the subsequent use of the sheet.

13 Claims, 10 Drawing Figures

INVENTORS
FRANZ KOLTERER
GARY UCHYTIL
BY
Townsend and Townsend
ATTORNEYS

INVENTORS
FRANZ KOLTERER
GARY UCHYTIL
BY
Townsend and Townsend
ATTORNEYS

SELECTIVE SPOT PLATING OF LEAD FRAME SHEETS

BACKGROUND OF THE INVENTION

The present invention relates to the economic masking of apertures and all but selected zones or portions of sheet surfaces. The present invention is particularly well adapted for incorporation in manufacturing processes for lead frames for semiconductor devices and the like. Such lead frames generally comprise a center plate onto which a semiconductor chip is later placed and which is connected with a plurality of connectors extending from the center plate. The connectors are separated from each other and the center plate by relatively narrow spaces that are as small as a fraction of a millimeter.

In the manufacture of semiconductor devices incorporating the above described lead frames, one side of the center plate and the connectors are usually gold plated. The remaining portions of the frame, however, should not be plated to prevent the waste of expensive gold and to facilitate the ease with which a plastic sealant can be applied to the finished semiconductor device since such plastic sealants adhere substantially better to the lead frame base metal than to the gold.

Lead frames are usually etched in relatively large sheets which are simultaneously plated before they are severed into lead frame strips or individual lead frames for constructing the semiconductor devices in the above described manner. In the past, proper masking of the sheet so that only those portions of each lead frame which require gold plating are actually plated has encountered a great deal of difficulty. The masking of the narrow apertures with plastic materials and the like frequently failed or was too expensive for incorporation in a commercial process. Furthermore, the proper alignment of the sheet surface masking with the multiplicity of etched lead frames in the sheet was difficult, time consuming and expensive. Frequently, the masking was unsatisfactory, misaligned with respect to the lead frames and required further work on the lead frames such as the removal of excess plating to assure good adhesion between the semiconductor, the lead frame and the plastic sealant with which the finished device was enveloped. Consequently, lead frames constructed in accordance with the prior art significantly contributed to the cost of semiconductor devices.

SUMMARY OF THE INVENTION

The present invention provides a method for masking the apertures or narrow passages of a sheet into which a multiplicity of lead frames have been etched as well as for masking all sheet surfaces except the surface zones that are to be plated. The apertures and passages in the sheet are filled with a photosensitive material which hardens when the material is subjected to light. For purposes of this invention, such a photosensitive material is sometimes referred to as a "photo-hardenable material." Its chemical composition is not known to applicant and is believed to be kept a trade secret by its manufacturer, the Dynachem Corporation of Santa Fe Springs, California. Dynachem commercially sells the material under the trademark "LS 500."

Each side of the sheet also receives a photosensitive facing constructed of a material which, when one part has been exposed to light while another part of the material remained unexposed, permits the stripping of one of the parts by simply immersing it in a suitable developing solution. A presently preferred facing material comprises a photosensitive polymer, which is dissolvable in a trichloroethane solution while unexposed, and which is commercially available in thin sheets from the DuPont Company of Wilmington, Delaware, under the trademark RISTON. The exact chemical composition of RISTON dry film is not known to applicants and is believed to be kept a trade secret by its manufacturer.

Use of the above referenced materials is preferred since, as will become more apparent hereinafter, the materials are mutually compatible and can be exposed with light of about the same wave lengths. Furthermore, the materials can be simultaneously stripped by immersing them in a potassium hydroxide solution at a temperature of about 220° F. This substantially facilitates the ease with which the masking is applied prior to the plating step and the speed with which the masking is stripped thereafter. It thus results in appreciable cost savings.

The present invention provides a method in accordance with which a sheet having a multiplicity of relatively narrow apertures and passages as small as a fraction of a millimeter can be zone plated on one side only without plating any of the interior walls of the apertures and passages. Briefly speaking, the method of the present invention comprises the steps of blocking one end of an opening, filling the opening with a photo-hardenable material and adhering a photosensitive facing to the side of the sheet opposite the blocked opening end. Selected portions of the facing overlying the sheet are masked and the photo-hardenable material and the unmasked portions of the photosensitive facing are subjected to radiant energy to thereby harden the material and expose the unmasked portions. One of the exposed and unexposed portions of the facing are then removed and the sheet is submerged in an electroplating bath with the other one of the exposed and the unexposed facing portions adhered to the sheet in an electroplating bath for plating the sheet portions or zones. Thereafter, the photo-hardenable material and the other one of the exposed and unexposed facing portions are dissolved and the aperture blocking is removed to bare a sheet which now has electroplated side portions and unplated openings.

In the preferred embodiment of the invention, the openings are blocked by applying the same photosensitive facing to both sides of the sheet. The facings and the developing bath are so selected that only unexposed portions of the facing are removed. By exposing the facing blocking the openings none of it is removed during the developing step so that the side of the sheet defining the blocked opening ends remains unplated when the sheet is immersed in the electroplating bath. In addition, the exposing step comprises the step of subjecting both sides of the sheet to light so that the photo-hardenable material in the openings is subjected to radiant energy from both ends of the opening. This facilitates the speed with which the photo-hardenable material is hardened and further assures the hardening of those materials which underlie a masked zone on the other side of the sheet and which, therefore, cannot be reached with a light source disposed on the side of the sheet over which a mask is placed during the exposing step.

The method of the present invention is highly effective in accurately and precisely masking all those portions of a sheet, including its narrow passageways, which are not to be plated. The used materials and the manner in which they are applied and removed from the sheet during a complete manufacturing cycle are relatively inexpensive and provides the desired position at low cost. The present invention furthermore eliminates heretofore sometimes necessary additional cleanup steps to remove plating materials from undesired parts of lead frames which resulted from inadequate and/or inaccurate masking. Thus, the present invention provides a substantially more economical method for zone plating large numbers of lead frames and the like.

DESCRIPTION OF THE PREFERRED EMBODIMENTS

Figures 1, 2, 3, 4:
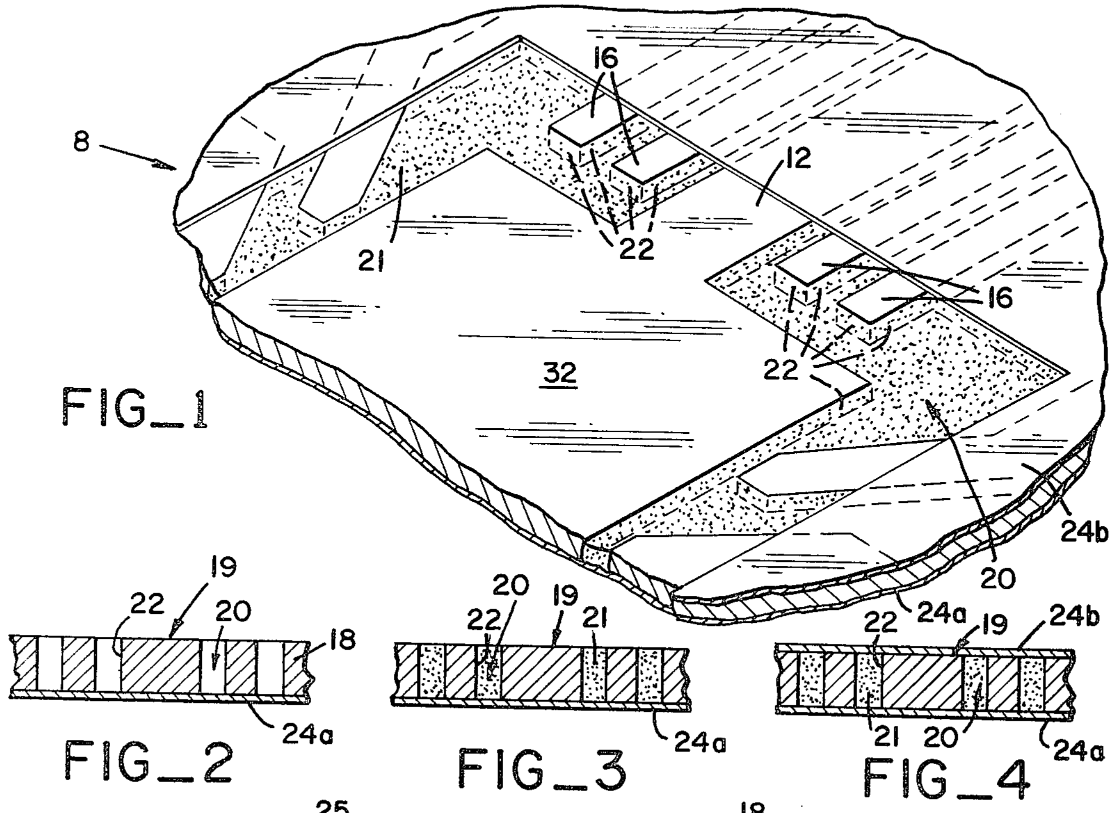
FIG. 1 is a fragmentary side elevational, perspective view which illustrates a center portion of a lead frame after small apertures or passages in the frame have been filler masked and a portion of the frame has been zone masked prior to the electroplating step.
FIG. 2 is an enlarged, schematic front elevational view, in section, of a single lead frame only to which a first aperture blocking photosensitive facing has been applied.
FIG. 3 is a cross sectional view similar to FIG. 2 but illustrates the filling of openings, narrow passages and the like with a photo-hardenable, readily deformable material.
FIG. 4 is a cross sectional view similar to FIG. 3 but illustrates the application of a second photosensitive facing applied to the other side of the lead frame.

Referring to FIGS. 1 through 4 and 6, a lead frame 8 generally comprises a center plate 10 connected to an outer portion 12 of the frame by one or more arms such as arms 13, 14 and 15. A plurality of connectors 16 of various shapes and sizes extend from the outer frame portion to adjacent the periphery of center plate 10 but are spaced from each other and from the center plate. In the manufacture of a semiconductor device, a semiconductor chip or transistor (not shown) is placed on the center plate, soldered up with the various connectors and then fixed in place by applying a hardenable plastic sealant or the like over the chip and the soldered joints. Thereafter, the semiconductor device is severed from the outer frame portion 12 by shearing arms 13 through 15 and connectors 16 so that the arms and the connectors form the terminals of the device.

To assure high electric conductivity, the surfaces of center plate 10, arms 13 through 15 and connectors 16 which come in contact with the semiconductor chip and/or are soldered thereto are usually gold plated to facilitate the soldering operation. To assure the subsequent adherence of a plastic sealant for the finished semiconductor device to the lead frame base metal instead of to the plating metal and to reduce gold consumption during the plating process the spaces between the arms, the connectors and the center plate are masked to prevent the plating of such spaces. Both sides of each lead frame are further masked to prevent their plating except for relatively small zones 19 on one side of the frame. On the frame illustrated in the drawings the plating zone includes center plate 10 and those portions of arms 13 through 15 and connectors 16 adjacent the center plate. The present invention is particularly concerned with the efficient, high quality masking of all parts of the lead frame which are not to be plated.

In the high volume manufacture of lead frames, large sheets 18 are prestamped to define therein a multiplicity of individual lead frames 8. All lead frames of one sheet are simultaneously electroplated and thereafter the sheet is severed into strips or individual frames prior to the application of the semiconductor chip (not shown) and the soldering operations. Thus, before the sheet is plated the portions thereof which are to remain bare, i.e. the spaces and passages, generally identified with reference numeral 20, between center plate 10, arms 13 through 15 and connectors 16 as well as underside 17A of the sheet and all portions of the upper side 17B of the sheet excluding zones 19 are masked. A first facing 24A is applied to the underside 17A of the sheet, a second facing 24B is applied to upper side 17B and spaces or passages 20 in the sheet are filled with a photo-hardenable material 21, preferably with the above described "LS 500" material. As is more fully described hereinafter, those portions of facing 24B overlying zones 19 are removed to bare the underlying sheet surfaces for their electroplating.

Before photo-hardenable material 21 is applied to the sheet, facing 24A is adhered to underside 17A. The facing can be constructed of any photoconductive material which permits light of a frequency range of between about 3,280 Angstroms to about 3,720 Angstroms, the frequency range at which the photo-hardenable material solidifies, to pass therethrough. One particularly suitable material comprises the above described photosensitive polymer film commercially available from the DuPont Company under the trademark RISTON. That polymer is supplied in thin films and is adhered to sheet 18 by placing it over the sheet and then heating the film to about 225° F. with a heated roller (not shown) to thereby simultaneously secure the polymer to the sheet.

After lower facing 24A has been applied, a quantity of photo-hardenable material 21 is placed on upper side 17B of sheet 18. With a roller (not shown) or a draw bar (not shown) the plastically deformable, paste like photo-hardenable material is forced into passages 20 until they are filled. Thereafter, excess material is removed from sheet 18 by sliding a resilient member (not shown) across the uncovered side of the sheet to thereby remove all photo-hardenable material not disposed in a passage and to assure that the passages are filled so that the photo-hardenable material is flush with the sheet surface 17B.

Second photosensitive facing 24B is now applied to upper sheet surface 17B in the same manner in which lower facing 24A was applied to lower sheet surface 17A. Thereafter, a mask or shield 40 is placed over the sheet and aligned therewith, as by aligning the mask up with reference dowl pins or holes (not shown) in sheet 18, so that light is prevented from contacting those portions of upper facing 24B overlying zones 19 that are to be plated.

Figure 5:
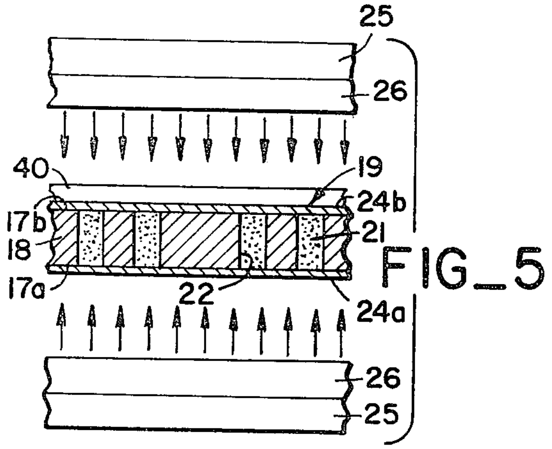
FIG. 5 schematically illustrates a sheet into which a multiplicity of lead frames have been etched and which has been provided with two photosensitive facings and a photo-hardenable material in its openings as it is being subjected to collimated light for fully exposing one of the facings and zone exposing the other facing and for solidifying the photo-hardenable material in the openings.
Figure 6:
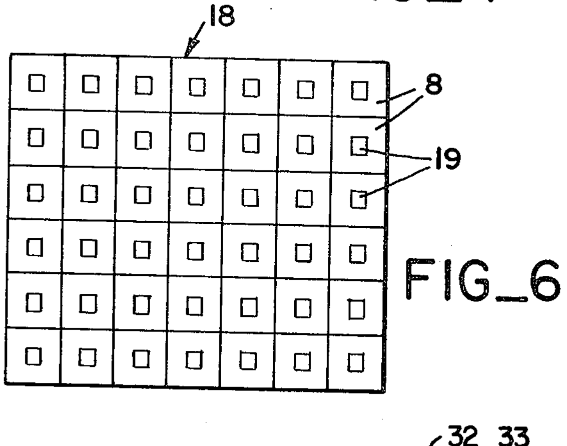
FIG. 6 is a schematic plan view of a sheet into which a multiplicity of lead frames have been etched.
Figure 10:
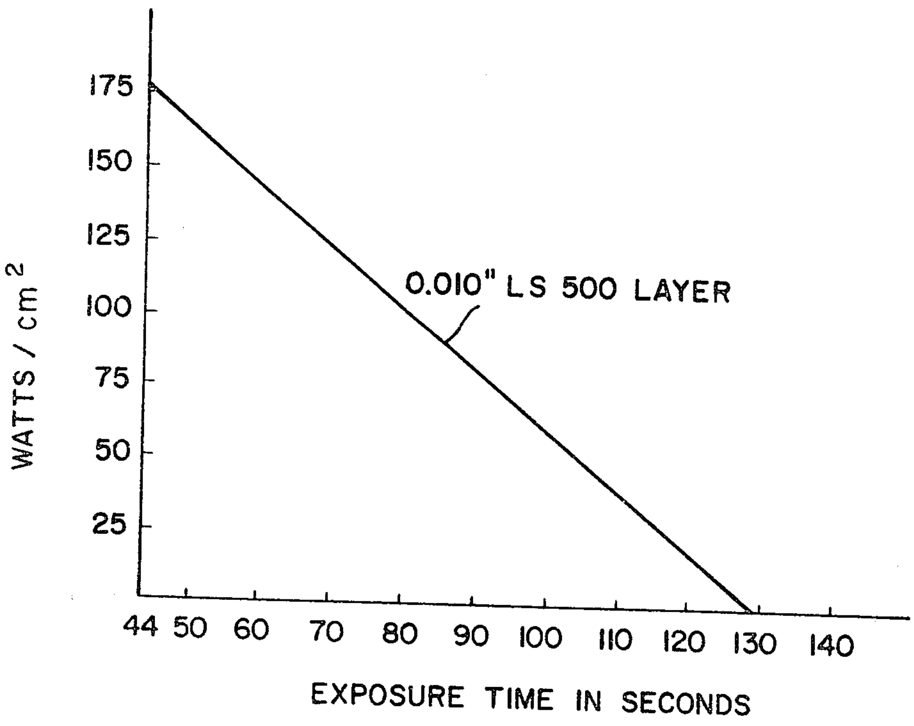
FIG. 10 is a diagram showing the relationship between light intensity and exposure time for a photo-hardenable material layer of 0.010 inch thickness.

Referring now to FIGS. 1, 5 and 10, photo-hardenable material 21 is hardened or solidified by subjecting it to light of a wave length between about 3,280 and about 3,720 Angstroms for the above described "LS 500" material. This light exposure also exposes the unmasked portions of facings 24A and 24B. To assure clear, straight and sharp separation lines between the exposed and unexposed portions of facing 24B, which later define the plating boundary lines as will be described more fully hereinafter, light from sources 27 is passed through collimators 26 to collimate the light and thereby assure that the separation lines are sharp and the photo-hardenable material is substantially uniformly exposed to light.

The light intensity and exposure time is controlled by the requirements of the photo-hardenable material since the photosensitive facings 24A and 24B require only short exposure times and are substantially insensitive to variations in the intensity of the light and its wave length. The light intensities can be increased or decreased as illustrated in FIG. 10 which requires a corresponding decrease or increase, respectively, in the exposure times for the photo-hardenable material. The diagram of FIG. 10 illustrates the required exposure times for various light intensities expressed in watts per square centimeter for an "LS 500" layer of a thickness of 0.010 inch. Thicker or thinner layers require a linearly longer or shorter exposure time, respectively. Thus, an "LS 500" layer of 0.020 inches has a light intensity of about 125 w/cm² necessitates an exposure time of about 140 seconds.

Directing light at the sheet from both sides thereof substantially reduces the required exposure time for hardening photo-hardenable material 21 in passages 20 of the sheet. More importantly, however, those portions of the photo-hardenable material which lie beneath a masked section of upper facing 24B, or which are within plating zones 19, and which must, therefore, be closed to prevent the entrance of electrolyte into the passages when the sheet is submerged in an electroplating bath, are exposed to light from the light source adjacent underside 17A of the sheet as viewed in FIG. 5.

Figure 7:
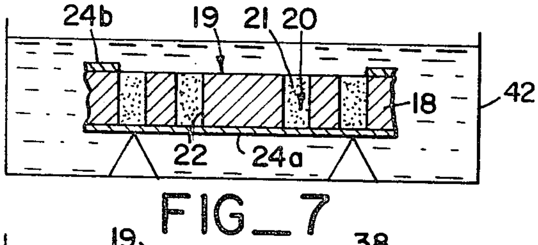
FIG. 7 is a schematic side elevational view illustrating the photo developing bath for removing unexposed portions of the photosensitive facing.
Figure 8:
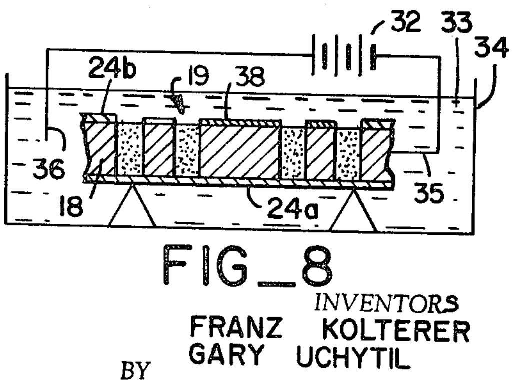
FIG. 8 is a schematic side elevational view of the sheet during zone plating.
Figure 9:
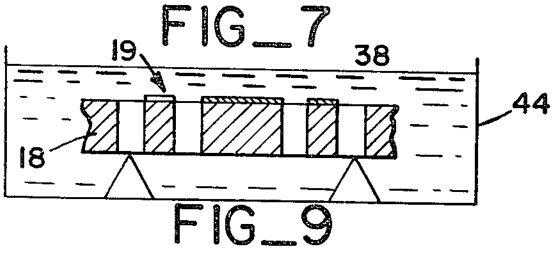
FIG. 9 is a schematic side elevational view of the sheet while stripping the facings and the photo-hardenable material.

Referring to FIGS. 7 through 9, after the photo-hardenable material 21 has been sufficiently exposed to light to substantially completely solidify it without undue shrinkage and a resulting separation of the material from the passage walls 22 due to an overexposure, which can result from time and/or intensity overexposures beyond about the limit indicated by the diagram on FIG. 10, sheet 18 is immersed in the developing tank 42 illustrated in FIG. 7. When RISTON photosensitive film is employed as the polymer for facings 24A and 24B developing tank 42 is filled with a stabilized 111-trichlorethane which develops, e.g. dissolves those portions of the facings that have not been exposed to light. Since only the facing portions which overlie zones 19 are not exposed only the zones are bared in the developing tank. After developing the sheet is washed in water, dried and submerged in electrolyte 33 of electroplating tank 34. A suitable source 32 supplies power to electrodes 35 and 36. By virtue of the masking of the entire sheet 18, including passages 20, except for zones 19 on upper sheet sides 17B, plating 38 is deposited at the zones 19 only.

Still referring to FIGS. 7 through 9, after the completion of the electroplating step sheet 18 is withdrawn from the electrolyte and immersed in another tank 44 that contains a solution capable of dissolving the photo-hardenable material 21 and, preferably, capable of simultaneously therewith dissolving facings 24A and 24B. When the photo-hardenable material comprises the above described "LS 500" and facings 24A and 24B are constructed of RISTON photosensitive polymeric film the solution in tank 44 comprises potassium hydroxide, a relatively low cost dissolving agent for both materials. After both the photo-hardenable material and the facing has been completely stripped sheet 18 is withdrawn from the tank, washed and dried and severed into lead frame strips or individual lead frames 8 for further work as briefly outlined above.

Although this invention has been described in connection with the manufacture of lead frames having gold plated surfaces, it is obvious that it can be employed for the manufacture of other articles. Furthermore, it might be desirable to apply the photo-hardenable material to only some of the spaces or passages extending across the sheet thickness, or after masking the sheet may be etched, painted, sprayed or otherwise surface treated. In addition, the physical configuration of the spaces, the sheet and the final product may vary widely from that shown in the drawings.

We claim:

1. A method of at least partially plating a side of a sheet including at least one small size opening extending from one side to the other side of the sheet without plating the opening, the method comprising the steps of blocking one end of the opening, filling the opening with a photo-hardenable material, adhering a photosensitive facing to the side of the sheet opposite the blocked opening end, masking selected portions of the facing overlying the sheet, subjecting the photo-hardenable material and unmasked portions of the photosensitive facing to radiant energy to thereby harden the material and expose the unmasked portions, removing one of the exposed and unexposed portions of the facing, submerging the sheet with the other of the exposed and unexposed facing portions adhered to the sheet in an electroplating bath for plating the sheet portions, and thereafter dissolving the material and said other one of the exposed and unexposed facing portions and removing the aperture blocking whereby a sheet having electroplated side portions and an unplated opening is obtained.

2. A method according to claim 1 wherein the step of removing the opening blocking comprises the step of dissolving the blocking simultaneously with the step of dissolving the material and the facing.

3. A method according to claim 1 wherein the opening blocking is a material permitting the passage of radiant energy therethrough, and wherein the step of subjecting the material to radiant energy comprises the step of subjecting the material to radiant energy from both ends of the opening to facilitate the speed with which the material is hardened.

4. A method according to claim 1 wherein the step of blocking one aperture end comprises the step of adhering another photosensitive facing that is dissolvable in the same solution as the first mentioned facing to the side of the sheet on which the opening is to be blocked, and wherein the step of subjecting the facing and the material to radiant energy includes the step of subjecting all of the other facing to the radiant energy.

5. A method according to claim 1 wherein the step of subjecting the material and the photosensitive facing comprises the step of directing collimated light perpendicularly to the sheet towards the material and the photosensitive facing.

6. A method according to claim 1 wherein the step of subjecting the photosensitive surface and the material to radiant energy comprises the step of subjecting them to light of a wave length between about 3,280 to about 3,720 Angstroms.

7. A method of selectively plating at least portions of at least one side of a three dimensional sheet having a plurality of narrow passages through the sheet without plating the passages comprising the steps of: placing a photosensitive facing over one side of the sheet to extend across ends of the passages, the sheet being of the type that permits the passage of light and dissolves in a solution only where it has not been subjected to light, filling at least some of the passages with a photo-hardenable material, placing a second photosensitive facing over the other side of the sheet, masking the portions of the sheet that are to be plated, exposing both sides of the sheet to radiant energy to thereby harden the material and enable the dissolution of the unmasked portions of at least one facing, developing the photosensitive facings to remove the portions of the facing that have been masked, electroplating the portions of the sheet from which the facing has been removed, and then dissolving remaining photosensitive facings and the material to bare the unplated portions of the sheet.

8. A method according to claim 7 including the step of controlling the exposing step to obtain a substantially complete hardening of the material and prevent a separation between the material and the openings.

9. A method according to claim 7 wherein the step of exposing includes the step of collimating light directed at the sheet before it strikes the facings to obtain sharp edges between exposed and unexposed facing portions after the developing step and to thus assure that the edges of the plating deposits are sharp.

10. A method according to claim 9 wherein the step of exposing comprises the step of providing a fiber optic light source, and passing the light source in a rectilinear path over the sheet.

11. A method of manufacturing lead frames having plated leads from a large sheet having a multiplicity of spaced apart passages through the sheet by electroplating selected portions of at least one side of the sheet without plating the openings, and thereafter severing lead frames each having at least one opening from the sheet, the method comprising the steps of: adhering a first facing to one side of the sheet to thereby close one end of the openings to be masked, placing a plastically deformable material that hardens without shrinkage when subjected to light on the other side of the sheet, squeegeeing the material into the openings to fully fill the apertures and substantially completely remove all excess material from the other side of the sheet, masking those portions of the facing that overlie the selected portions of the sheet, subjecting both sides of the sheet to radiant energy of a wave length of between about 3,280 to about 3,720 Angstroms and a sufficient intensity and for a sufficient length of time to substantially fully harden the material without separating it from the apertures and thereby also expose the unmasked portions of the facing, developing the facing in a solution to remove unexposed portions thereof, electroplating the selected sheet portions from which the facing had been removed, and chemically dissolving the materials and the exposed facing portions before severing the sheet into frames to bare the portions of the sheet covered by the material and the exposed facing.

12. A method according to claim 11 including the step of adhering a facing constructed of the same substance as the first mentioned facing to the other side of the sheet prior to the step of subjecting the facing and the material to light to thereby close the openings and prevent the plating of the other sheet side.

13. A method according to claim 13 wherein the step of adhering comprises the step of providing photosensitive polymer sheets, placing the polymer sheets against sides of the first mentioned sheet, heating the polymer sheets to soften them and form an adhesion between the polymer sheets and said first mentioned sheet, and then cooling the sheets to adhere the polymer facings to the first mentioned sheet.

* * * * *

PO-1050
(5/69)

UNITED STATES PATENT OFFICE
CERTIFICATE OF CORRECTION

Patent No. 3,663,376 Dated May 16, 1972

Inventor(s) Gary Uchytil and Franz Kolterer

It is certified that error appears in the above-identified patent and that said Letters Patent are hereby corrected as shown below:

Insert name of assignee as follows:

--Micro Science Associates, Mountain View, California -- .

Signed and sealed this 26th day of December 1972.

(SEAL)
Attest:

EDWARD M.FLETCHER,JR.
Attesting Officer

ROBERT GOTTSCHALK
Commissioner of Patents